G. A. RICHARDS.
PIPE COVERING.
APPLICATION FILED FEB. 7, 1911.

1,002,932.

Patented Sept. 12, 1911.

Witnesses
Harold O. Van Antwerp
Anna De Windt

Inventor
Glendon A. Richards
By Luther V. Moulton
Attorney

UNITED STATES PATENT OFFICE.

GLENDON A. RICHARDS, OF GRAND RAPIDS, MICHIGAN, ASSIGNOR TO RICHARDS-WILSON PIPE COVERING CO., OF GRAND RAPIDS, MICHIGAN, A CORPORATION OF MICHIGAN.

PIPE-COVERING.

1,002,932.  Specification of Letters Patent.  Patented Sept. 12, 1911.

Application filed February 7, 1911. Serial No. 607,161.

*To all whom it may concern:*

Be it known that I, GLENDON A. RICHARDS, a citizen of the United States of America, residing at Grand Rapids, in the county of Kent and State of Michigan, have invented certain new and useful Improvements in Pipe-Coverings; and I do hereby declare the following to be a full, clear, and exact description of the invention, such as will enable others skilled in the art to which it appertains to make and use the same.

My invention relates to improvements in pipe coverings and its object is to provide a water-proof pipe covering having a heat insulating integral lining, and adapted to be laid under ground or in other exposed places, to provide a heat insulating lining spaced apart from the pipe leaving an air space therebetween and to provide the device with various new and useful features hereinafter more fully described and particularly pointed out in the claims, reference being had to the accompanying drawings in which:—

Figure 1:
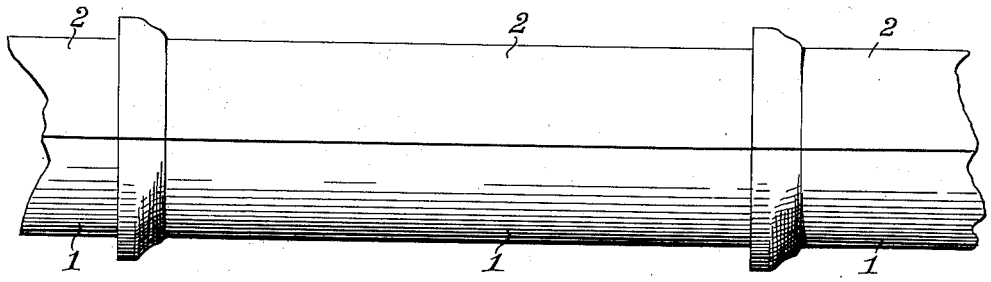
Figure 2:
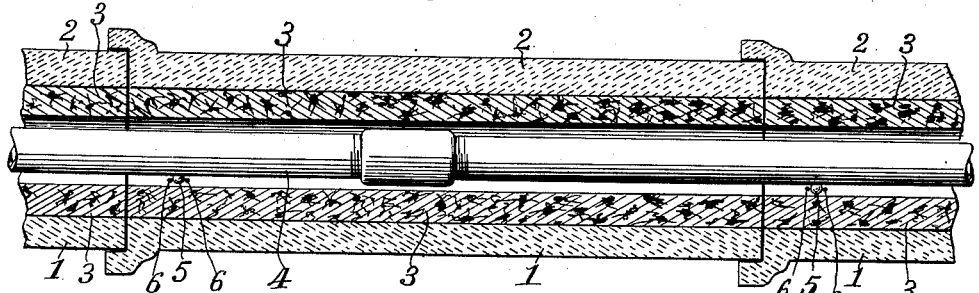
Figure 3:
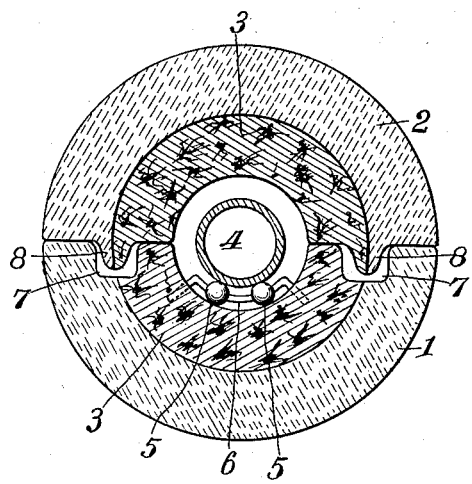
Figure 4:
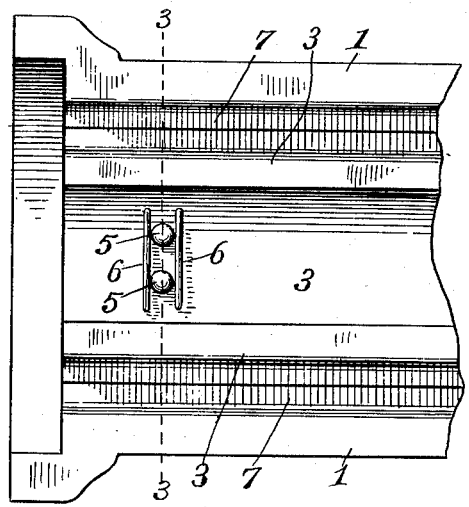

Figure 1 is a side elevation of a portion of a pipe covering embodying my invention; Fig. 2 a longitudinal vertical section of the same; Fig. 3 an enlarged transverse section on the line 3—3 of Fig. 4; and Fig. 4 a detail in plan view of one end of a lower section.

Like numbers refer to like parts in all of the figures.

The outer casing or shell is composed of a longitudinally divided tile 1—2 preferably made of concrete and provided with an integral heat insulating lining 3 in the axis of which is a tubular passage in which is supported the pipe to be protected and insulated.

1 represents the lower half of the tile or shell and 2 the upper half of the same divided longitudinally in the plane of the axis and having an external form of tile, said portions 1 and 2 being preferably made of concrete, and the interior provided with a heat insulating lining 3 of material adapted to unite integrally with the outer portions 1 and 2 and to be molded therewith and also to become inseparable therefrom, whereby the lining is supported separate and spaced apart from the pipe and the device may be used without placing separate insulating material within the outer casing and providing a special support for the same.

4 represents the pipe to be protected which is of less diameter than the axial opening of the covering whereby it is spaced apart from the insulating material. I prefer to support the pipe at intervals upon balls 5 which balls are held in place by transversely disposed rods 6 bent concentric with the axis and with their ends turned outward and inserted in the lining. These transverse rods are arranged in pairs and spaced apart to receive the balls therebetween and hold the same in place. The pipe 4 rests upon these balls and moves readily thereon as the pipe expands and contracts. The lower portions 1 of this structure are provided with longitudinal grooves 7 therein and the upper portions with tongues 8 to project within the grooves and thus properly locate the portions relative to each other. The tongue is of less dimension than the groove whereby a space therebetween is left which in the finished structure is to be filled with cement or other material adapted to seal the joint and render the structure water-proof.

I have found that a suitable heat insulating material that will adhere to the outer shell of concrete is preferably made of the following ingredients in the following proportions, by weight:

| | |
|---|---|
| Anhydrous silica—or dry sand | 25% |
| Magnesium silicate—or asbestos | 10% |
| Portland cement | 15% |
| Calci sulphas exsiccatus—or calcined plaster | 30% |
| Calcium oxid—or lime | 20% |

This produces a very satisfactory insulating lining that will readily adhere to the concrete outer portion or shell and can be readily molded therewith in suitable molds for the purpose. I do not however, limit myself to the precise proportions or to the exact materials, it being only necessary to provide a suitable non-conducting material that can be molded with the concrete and that will adhere thereto when the article is finished.

What I claim is:—

1. A pipe covering comprising an outer waterproof case divided longitudinally and an integral lining of heat insulating material having an axial opening therethrough, and provided with a groove in one part and a tongue in the other part and pipe supports at intervals to support a pipe in the axis of the opening and spaced apart from the lining.

2. A pipe covering, comprising an outer tile-shaped case of concrete divided longitudinally and a heat insulating lining molded with the case and integral therewith, and pipe supports at intervals projecting inward from the lining.

3. A pipe covering, comprising an outer tile-shaped case of concrete divided longitudinally and a heat insulating lining consisting of sand, asbestos, cement, calcined plaster and lime, molded integrally with the concrete case.

4. A pipe covering, comprising a waterproof tile-shaped case divided longitudinally, an integral heat insulating lining and transversely disposed rods projecting inward from the lining.

5. A pipe covering, comprising a waterproof tile-shaped case divided longitudinally, a heat insulating lining integral with the case, transversely disposed curved rods projecting inward from the lining and arranged in pairs, and balls between each pair of rods to support a pipe.

6. A pipe covering, comprising a divided tile-shaped outer case of concrete, a heat insulating lining molded with the case and integral therewith, said case and lining provided with a tongue and groove spaced apart to receive cement therebetween, and inwardly projecting supports for a pipe to space the same apart from the lining.

In testimony whereof I affix my signature in presence of two witnesses.

GLENDON A. RICHARDS.

Witnesses:
  LUTHER V. MOULTON,
  HAROLD O. VAN ANTWERP.